Jan. 4, 1966 L. E. WOLINSKI 3,227,605
METHOD OF TREATING POLYETHYLENE WITH OZONE TO RENDER IT
ADHERENT TO COATINGS AND LAMINA AND RESULTANT ARTICLES
Filed Nov. 29, 1952
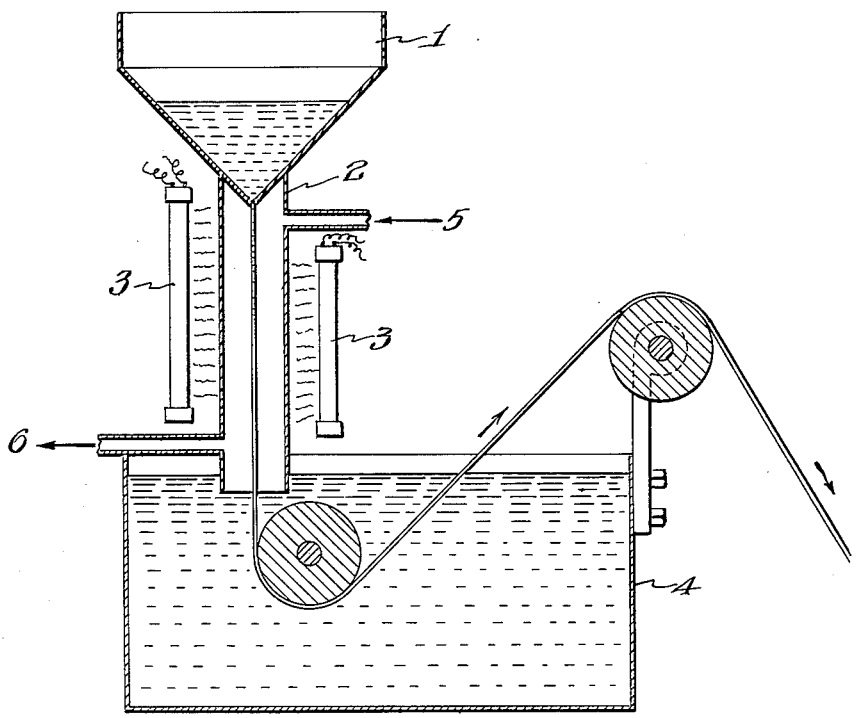
INVENTOR
LEON E. WOLINSKI
BY
ATTORNEY United States Patent Office 3,227,605
Patented Jan. 4, 1966

3,227,605
METHOD OF TREATING POLYETHYLENE WITH OZONE TO RENDER IT ADHERENT TO COATINGS AND LAMINA AND RESULTANT ARTICLES
Leon E. Wolinski, Buffalo, N.Y., assignor to E. I. du Pont de Nemours and Company, Wilmington, Del., a corporation of Delaware
Filed Nov. 29, 1952, Ser. No. 323,271
19 Claims. (Cl. 161—247)

This invention relates to a process of treating the surface of polyethylene structures and, more particularly, to a process of treating the surface of a polyethylene film to promote the adhesion thereto of printing inks and various other materials.

U.S. Patent 2,219,700 to Perrin et al. discloses and claims a polyethylene film, i.e., a film of a solid polymer of ethylene. In general, polyethylene films are tough, semi-transparent, resistant to many chemicals, exhibit a high degree of moisture vapor impermeability, permit the passage of oxygen, and are heat-sealable. Because of this combination of properties, polyethylene films are highly useful for packaging and wrapping a great variety of materials such as chemicals, fresh produce, dried milk, textiles, hardware, etc. Probably the only troublesome disadvantage of polyethylene film for use in the packaging field is the fact that standard aniline and rotogravure printing inks employed for printing various cellulosic films, such as regenerated cellulose and cellulose acetate films, do not adhere satisfactorily to the surface of the film. Generally, any indicia, such as trade marks, advertising indicia, recipes, etc., imprinted upon a surface of a polyethylene film with standard oil or lacquer type inks employed for printing cellophane film are easily smeared or rubbed off by the normal abrasions suffered by packages during shipping, handling, etc. Hence, in order to obtain satisfactory adhesion between a dried ink and a polyethylene film surface, it is necessary to employ a specially compounded ink or modify the film surface to promote improved ink adhesion.

Although printing inks compounded particularly for printing on polyethylene films have been developed, the use of most of these inks requires modification of standard printing processes; and the preferred approach is treatment of the polyethylene film surface to promote adhesion of standard oil and lacquer type inks.

An object of the present invention is to provide a process of treating the surface of a polyethylene structure, e.g., film, to improve adhesion of standard printing inks, i.e., promote adhesion of standard aniline and rotogravure inks employed in printing on cellophane film. Another object is to provide a process of treating the surface of a polyethylene film to improve adhesion thereof to various other materials, such as metals, paper, nitrocellulose coatings, and other polymeric coatings, e.g., nylon, polyethylene terephthalate, etc. A further object is to improve the adhesion of polyethylene film to itself and other materials when using commercial adhesives. A still further object is to provide a process of treating the surface of a polyethylene film to improve adhesion thereto of dried ink impressions and not impair the transparency of the film. A still further object is to provide a polyethylene film having modified surface characteristics such that dried ink imprints on the surface will not rub off when tested in accordance with the various tests described hereinafter. Other objects will be apparent from the following description of the invention.

These objects are realized by the present invention which, briefly stated, comprises subjecting a polyethylene structure, e.g., polyethylene film, at a temperature within the range of from about 150° to about 325° C. to the action of ozone, preferably in the presence of ultra-violet light.

It should be understood that 325° C. is not an upper limit insofar as the operability of the present invention is concerned. Extrusion of presently available polyethylene compositions at temperatures substantially higher than 325° C. is not practical because the melt is too fluid, and presently known antioxidants do not efficiently prevent degradation of the polymer at appreciably higher temperatures. With the development of polyethylene compositions which form a more viscous melt and the discovery of more efficient antioxidants, extrusion may be carried out more rapidly and efficiently at temperatures of 400° C. and above, the maximum being that temperature beyond which substantial degradation of the polyethylene composition occurs.

In the normal process of extruding molten polyethylene into film form, a molding powder or flake of polyethylene is fed continuously into a melt extrusion machine, and the molten film continuously extruded through a slot orifice and through an air gap vertically downward into a quench bath maintained at a temperature from 25°–95° C., preferably from 30°–60° C. Usually, the polyethylene is extruded from a melt maintained at a temperature within the range from 150° to 325° C. Tubing is usually extruded from a melt at a temperature within the range from 150°–200° C., whereas film is extruded at a temperature within the range from 250°–325° C. An alternative process of forming a polyethylene film comprises milling molten polymer on closely-spaced calender rolls to form a film which is conducted vertically downward into a quench bath. In either of these general methods of forming a polymeric film, the space between the point where the molten film leaves the slot orifice or the last calender roll and the point where the molten film enters a quench bath will hereinafter be termed the "air gap." During passage through the air gap, the film is merely permitted to pass uninhibited through the atmosphere; and this provides for some superficial cooling. Generally, the length of the air gap ranges from about 2″ to as long as 15″ in some cases.

Because of the rapid action of ozone upon the surface of polyethylene film at elevated temperatures, the process of the present invention is most conveniently carried out by subjecting freshly extruded film at a temperature of from about 150° to about 325° C. to the action of ozone as the film passes through the air gap. For example, freshly extruded film may be treated in accordance with this invention by suitably enclosing the air gap and providing for the maintenance in the enclosure of an atmosphere, e.g., air, containing ozone. Provision may be made for the employment of ultra-violet light by making the walls of the enclosure transparent to ultra-violet light or by installing a source of ultra-violet light inside of an opaque enclosure. Hence, the process of the present invention may be carried out by making very simple modifications to existing film-forming or tube-forming apparatus; and, owing to the rapid action of ozone, employment of the present process does not preclude production of film at commercially satisfactory rates. Normally, in order that polyethylene film may be treated in accordance with the present invention as part of presently employed extrusion or calendering techniques of forming the film, the time of treatment should be no greater than about 2 seconds in order to permit operation at commercially acceptable rates.

Treatment of the film maintained at an elevated temperature is essential for obtaining rapid modification of the film surface with ozone. Normally, treatment at temperatures substantially below 150° C. does not provide for obtaining rapid action with ozone.

For effective action within the relatively short exposure times permissible in the treatment of film being extruded at commercially acceptable rates, the concentration of ozone in the treating atmosphere must be at least 0.05%, by volume of the total volume of gases present in the treating gases, and, preferably, the concentration is 0.5–1%. The use of ozone concentrations substantially greater than 5%, by volume of the total gases surrounding the film, is not particularly practical because of the restricted capacity of present day ozone generating equipment. This applies to continuous treatment of film wherein the ozone-containing gas, e.g., air, is passed continuously through the treating chamber; and additional ozone is injected into the out gases which are then recirculated. Ozone concentrations as high as 10% do not tend to "burn" the film, i.e., impair transparency or semi-transparency of the film, so long as the time of treatment or exposure is not excessive.

Preferably, ultra-violet light having a wave length no greater than 3900 A.U. is employed to accelerate the action of ozone, particularly where the process of this invention is incorporated in the continuous production of film.

The following examples illustrate the preferred practice of this invention, reference being had to the accompanying drawing wherein is shown diagrammatically an arrangement of apparatus used in carrying out the process of this invention.

Referring to the drawing, molten polyethylene, at a temperature of 265° C., was extruded in the form of a film F from extrusion hopper 1 into the air gap surrounded by an enclosure constituting a treating chamber 2, the walls of which are formed in part, at least, of transparent material (quartz glass) to provide for the transmission therethrough of ultra-violet light emitted from mercury arc lamps 3 placed two inches from the film. The upper end of the chamber was closed by the extrusion hopper, and the bottom of the chamber was sealed from the atmosphere by projecting the sides thereof below the surface of the cooling water (60° C.) in the quench bath 4. The length of the air gap was 10 inches, and the path of travel of the film in the quench bath was also 10 inches. Air at atmospheric pressure and containing ozone was passed into the chamber at 5 and out at 6. At no time did the temperature of film in chamber 2 drop below 200° C. The treatment times set forth in the following table are the actual times that any given increment of the film remained in the treating chamber.

TABLE I

| Example | Percent Ozone | Presence of Ultra-Violet Light | ° C. Film Temp. (In air gap) | Time of Treatment (sec.) | Printability |
| --- | --- | --- | --- | --- | --- |
| 1 | 0.1 | No | 200–265 | 1.56 | Excellent. |
| 2 | 0.1 | Yes | 200–265 | 0.94 | Do. |
| 3 | 2.0 | No | 200–265 | 0.092 | Do. |
| 4 | 2.0 | Yes | 200–265 | 0.055 | Do. |
| 5 | 0.55 | No | 200–265 | 0.308 | Do. |
| 6 | 0.55 | Yes | 200–265 | 0.183 | Do. |

In evaluating the printability, i.e., the strength of the adhesive bond between the dried ink and the treated polyethylene film surface, a number of tests were employed (5 in all); and on the basis of the results of all of the tests, the films were rated either accepable or not acceptable, and, if acceptable, either excellent or good. Four different inks were employed to print the treated surfaces of polyethylene film, and each printed sample was evaluated in accordance with each of the five tests which will be described hereinafter. The inks empolyed were as follows:

No. 1 Aniline Cellophane Iink (Bensing Bros. and Deeney, No. W–400).
No. 2 Aniline Polyethylene Ink (Interchemical Corporation, No. PA–Red).
No. 3 Rotogravure Cellophane Ink (Bensing Bros. and Deeney, No. G–1037).
No. 4 Rotogravure Polyethylene Ink (Interchemical Corporation, IN–Tag–Red, GPA Red).

In preparing the printed samples of polyethylene film, the ink was applied with a commercial ink spreader which comprised a steel rod having fine wire wrapped around the rod. The spreader produced a multiplicity of fine lines. The ink was then dried for three minutes at 70° C. and thereafter permitted to cool to room temperature. Each sample was then tested in accordance with each of the following tests, and the amount of ink rubbed off and/or removed was noted:

(1) *Rub test.*—The inked polyethylene surface was rubbed ten times against a hard white paper.

(2) *Scratch test.*—The back of a fingernail was rubbed across the inked surface.

(3) *Flex test.*—The film was held between thumb and forefinger (2" apart) and flexed vigorously.

(4) *Presure-sensitive tape test.*—A presure-sensitive tape was pressed against the printed surface and then pulled off.

(5) *Twist test.*—The printed film was folded once and then again in a direction perpendicular to the first fold. The folded ends were then twisted once around and thereafter the film surface was examined for smearing and/or cracking of the dried ink.

The examples summarized in the following table, Table II, illustrate the improvement in the adhesion of various polymeric coatings to the surface of polyethylene film treated with ozone in accordance with the present invention.

In all of the following examples, the polyethylene film was prepared by extrusion at a temperature of 265° C. and at a rate of 20 yards per minute through an air gap of 5" in length (time of treatment was about 0.4 second). During travel through the air gap, the polyethylene film was treated with ozone at a concentration of 0.95%, by volume of the total gases (air) in the air gap.

In Examples 7–14, inclusive, the polymers listed in the table were dissolved in the indicated solvents; and ozone-treated and untreated polyethylene films were coated by passing the films through a dip tank containing the polymer solutions; and the coatings were made smooth by passing the coated film through doctor rolls. The coatings were dried at 70–80° C. for 10 minutes. The polymers indicated in Examples 15 and 16 were coated on treated and untreated polyethylene films under substantially the same conditions but were dried at 80–90° C. All polymer solutions were maintained at room temperature during the coating operation except the polymer of Example 16 which was maintained in a solution at 60° C. The coating thicknesses in all cases varied from 0.0001–0.0005"; the coating thickneses of the same polymer, i.e., on the ozone-treated and untreated films, were substantially the same.

In testing the strength of the adhesion between the coating and the base film, two strips of the coated polyethylene film were heat-sealed together by pressing the coated sides of the film together. The strips were then pulled apart, and the force (measured in grams) required to pull the strips apart was measured. In all cases, the strips were pulled apart when the polymeric coatings were severed from the base sheet, the heat-seal bond strength between the adjacent coatings being stronger than the adhesion between the polymeric coating and the polyethylene base film. All heat-sealing and testing conditions were the same in the case of the ozone-treated film and the untreated film.

Table II summarizes the type of polymer coating applied, the solvent employed and the solids content of the solvent solution, and the resulting force required to pull the coated sealed strips apart. In all cases, the force required to separate strips of ozone-treated polyethylene film was considerably greater than that required to separate strips of untreated coated polyethylene film.

in width, were sealed to one another employing the adhesive. These seals were set under very light pressure for one hour at room temperature and aged for two days. The same seals were made with untreated polyethylene film. The force in grams required to pull the seals apart was measured for the various samples of ozone-treated film. For film which was treated for about 0.09 second, the bond strength was about 290 grams. For film treated for about 0.83 second, the bond strength was 375 grams. It is significant that the bond strength of untreated polyethylene film adhered together with the same type adhesive was substantially zero.

Although it is convenient and preferable to treat the polyethylene film with ozone in the air gap between the extrusion orifice and the quench bath as described above, or between the last calender roll and the quench bath, the film being at a temperature close to the actual melt

TABLE II

| Example | Polymer | Solvent | Percent Solids | Center Seal Strength, (grams) Ozonized Film | Seal Strength Untreated Film |
|---|---|---|---|---|---|
| 7 | Nitrocellulose | Ethyl acetate/butyl acetate 10/4 | 6% nitrocellulose, 4% plasticizer. | 600 | 175 |
| 8 | N-methoxymethyl polyhexamethylene adipamide. | Isopropanol/water 6/3 | 10 | +1,475 | 0 |
| 9 | Polyvinyl butyral | Isopropanol/water/butyl acetate 8/4/12. | 4 | +1,500 | 100 |
| 10 | Chlorinated rubber | Ethyl acetate/butyl acetate 1/1 | 10 | 750 | <80 |
| 11 | Ethyl cellulose | do | 6 | 1,060 | <90 |
| 12 | Vinyl chloride/vinyl acetate copolymer. | do | 10 | 1,350 | 60 |
| 13 | Interpolyamide [1] | Isopropanol/isobutanol/water 4/4/1. | 4 | +1,500 | 150 |
| 14 | Vinyl chloride/vinyl acetate copolymer. | Ethyl acetate/butyl acetate 1/1 | 10 | 400 | 0 |
| 15 | Interpolyamide [2] | n-Propanol/water 4/1 | 10 | 660 | <100 |
| 16 | Interpolyamide [3] | Ethanol | 10 | +1,200 | 150 |

[1] Interpolyamide of hexamethylenediammonium adipate, hexamethylenediammonium sebacate, and caprolactam 36/26/38.
[2] Interpolyamide of hexamethylenediammonium adipate, hexamethylenediammonium sebacate, and caprolactam 40/30/30.
[3] Interpolyamide of N-N-diisobutyl hexamethylenediammonium sebacate, N-isobutyl hexamethylenediammonium sebacate, and hexamethylenediammonium sebacate.

The following examples illustrate the improvement in adhering ozone-treated polyethylene film to paper, metals and to itself:

*Example 17*

The polyethylene film employed in this example was extruded from a melt at 265° C. at a rate of 15′ per minute through an air gap which was 5.5″ in length. The molten film was treated in the air gap with ozone at a concentration of 1.9% by volume. Each portion of the film was treated for a time of about 1.8 seconds.

A sample of the ozone-treated film was pressed onto a sheet of bond paper at a temperature of 60° C. and a pressure of 64 pounds per square inch. In order to obtain the same bond strength when laminating an untreated polyethylene film to the same type of paper, a temperature of 110° C. at the same pressure had to be employed.

*Example 18*

The same type of ozone-treated polyethylene film was adhered to a sheet of aluminum under a pressure of 64 pounds per square inch at 90° C. In order to obtain the same bond strength with untreated polyethylene film, the temperature had to be raised to 110° C. employing the same pressure.

*Example 19*

In this example, molten polyethylene film in the air gap was treated in an atmosphere containing 2% by volume of ozone. The times of treatment ranged from 0.09 second to 0.83 second.

An emulsion-type adhesive comprising a resin modified starch base, this adhesive generally used in sealing cellophane to itself, was employed for bonding polyethylene film to itself. Strips of ozone-treated film, 1½″ extrusion temperature, the process of the present invention may be applied to the film at a point after the film has been quenched. To carry out the process of the present invention at this point would require conducting the film through a hot air channel or oven for the purpose of reheating the film to a suitable temperature, i.e., above 150° C., and immediately thereafter or simultaneously treating the film in a confined atmosphere containing ozone.

Moreover, while the present process is employed primarily for treating the surface of a polyethylene film in order to produce a film which may be successfully printed with standard oil or lacquer type inks, e.g., aniline or rotogravure inks employed for printing on cellophane film, the present invention may be employed to modify the surface of a polyethylene film which is to be printed with inks which are especially modified for printing upon a polyethylene film surface. The net result is an even further improvement in the adhesive bonds between the dried ink and the polyethylene film surface. The present invention further provides for the preparation of a polyethylene film which is more readily adherent to metals, papers, and various coatings, such as those of nitrocellulose; polyamides, e.g., polyhexamethylene adipamide, polyhexamethylene sebacamide, N-methoxymethyl polyhexamethylene adipamide and other polyamides defined in U.S.P. 2,430,860, and interpolyamides defined in U.S.P. 2,285,009; polyethylene terephthalate; polyvinyl acetals such as polyvinyl butyral; ethyl cellulose; vinyl acetate-vinyl chloride copolymers; vinylidene chloride copolymers; chlorinated rubbers; etc. Furthermore, polyethylene film treated by the present process is more readily adhered to itself and other base materials by using commercial adhesives, e.g., standard adhesives employed for sealing cellophane.

The process of this invention may also be employed for treating the surface of various films fabricated from copolymers of ethylene with various other polymerizable materials, e.g., isobutylene, vinyl acetate, styrene, vinyl chloride.

The outstanding advantage of the present process is that it provides a readily applicable and rapid method of improving the adhesion of a dried printing ink to the surface of a polyethylene film. The process may be readily combined with a necessary step of extruding or calendering molten polyethylene into film or tube form, and the additional apparatus required is inexpensive and easy to install.

Another outstanding advantage of the present invention is that it provides for the preparation of an improved polyethylene film which forms heat seals of higher bond strength than seals made with films treated by any other known process of improving the adhesion of printing inks to polyethylene film. This is especially true of film which has been treated with a sizing composition, such as an aqueous solution of an alkyl aryl polyglycol ether of the type defined in U.S.P. 2,519,013.

As many widely different embodiments may be made without departing from the spirit and scope of this invention, it is to be understood that said invention is in no wise restricted except as set forth in the appended claims.

I claim:

1. A process for treating structures of polyethylene which comprises subjecting said structures to the action of a gaseous atmosphere containing at least 0.05% by volume of ozone at a temperature within the range of from 150° C. to the temperature beyond which substantial degradation of the polyethylene occurs, for a period of time sufficient to render said structures adherent to printing ink.

2. Polyethylene structures when treated in accordance with the process of claim 1.

3. A process for treating structures of polyethylene which comprises subjecting said structures to the action of a gaseous atmosphere containing at least 0.05% by volume of ozone at a temperature within the range of from about 150° to about 325° C., and in the presence of ultra-violet light having a wave length no greater than 3900 A.U., for a period of time sufficient to render said structures adherent to printing ink.

4. A process for treating polyethylene film which comprises subjecting said film to the action of a gaseous atmosphere containing at least 0.05% by volume of ozone at a temperature within the range of from 150° C. to the temperature beyond which substantial degradation of the polyethylene occurs, for a period of time sufficient to render said film adherent to printing ink.

5. A process for treating polyethylene film which comprises subjecting said film to the action of a gaseous atmosphere containing at least 0.05% by volume of ozone at a temperature within the range of from 150° C. to the temperature beyond which substantial degradation of the polyethylene occurs, for a period of time sufficient to render said film adherent to printing ink.

6. A process for treating polyethylene film which comprises subjecting said film to the action of a gaseous atmosphere containing at least 0.05% by volume of ozone at a temperature within the range of from 150° C. to the temperature beyond which substantial degradation of the polyethylene occurs, for a period of time sufficient to render said film adherent to printing ink., and thereafter coating such surface with a coating composition.

7. Polyethylene film when treated in accordance with the process of claim 6.

8. A process for treating polyethylene film which comprises subjecting said film to the action of a gaseous atmosphere containing at least 0.05% by volume of ozone at a temperature within the range of from 150° C. to the temperature beyond which substantial degradation of the polyethylene occurs, for a period of time sufficient to render said film adherent to printing ink, and thereafter laminating said film to a base material.

9. Polyethylene film when treated in accordance with the process of claim claim 8.

10. A process for treating polyethylene film which comprises subjecting the surface of said film to the action of a gaseous atmosphere containing at least 0.05% by volume of ozone at a temperature within the range of from about 150° to about 325° C., for a period of time sufficient to render said surface adherent to printing ink.

11. A process for treating polyethylene film which comprises subjecting the surface of said film to the action of a gaseous atmosphere containing at least 0.05% by volume of ozone at a temperature within the range of from about 150° to about 325° C., and in the presence of ultra-violet light, having a wave length no greater than 3,900 A.U., for a period of time sufficient to render said film adherent to printing ink.

12. A process for treating polyethylene film which comprises passing continuous film of polyethylene continuously through a zone wherein said film is maintained at a temperature within the range of from 150° C. to the temperature beyond which substantial degradation of the polyethylene occurs, and subjecting the surface of the film in said zone to the action of a gaseous atmosphere containing at least 0.05% by volume of ozone for a period of time sufficient to render said film adherent to printing ink.

13. A process for treating polyethylene film which comprises passing continuous film of polyethylene continuously through a zone wherein said film is maintained at a temperature within the range of from about 150° to about 325° C., and subjecting the surface of the film in said zone to the action of a gaseous atmosphere containing at least 0.05% by volume of ozone, for a period of time sufficient to render said film adherent to printing ink.

14. A process for treating structures of polyethylene which comprises subjecting said structure while at a temperature below which substantial degradation of the polyethylene occurs to the action of a gaseous atmosphere containing ozone for a period of time sufficient to render said structure adherent to coatings and thereafter coating said structure with a coating composition.

15. A strip for making a substantially gas impermeable polyethylene container having a modified surface and a vinylidene chloride polymer directly integrated with said modified surface of said polyethylene, whereby said polyethylene is rendered substantially impermeable to air, nitrogen, oxygen and carbon dioxide, said strip comprising a polyethylene base having a modified surface and a vinylidene chloride polymer directly integrated with the modified surface of said polyethylene.

16. A strip according to claim 15 wherein the modified surface is an oxidized surface.

17. The process comprising treating the surface of a polyethylene strip for use in making a substantially gas impermeable polyethylene container having a modified surface and a vinylidene chloride polymer directly integrated with said modified surface of said polyethylene, whereby said polyethylene is rendered substantially impermeable to air, nitrogen, oxygen and carbon dioxide, said process comprising uniformly subjecting the surface of the strip to oxidative influences of the oxygen type and then coating said treating surface with a vinylidene chloride polymer so that the vinylidene chloride polymer is directly integrated with the oxidized surface of said polyethylene.

18. A substantially gas impermeable polyethylene container having a modified surface and a vinylidene chloride polymer directly integrated with said modified surface of said polyethylene whereby said polyethylene is rendered substantially impermeable to air, nitrogen, oxygen and carbon dioxide.

19. A container according to claim 18 wherein the modified surface is an oxidized surface.

References Cited by the Examiner

UNITED STATES PATENTS

| | | | |
|---|---|---|---|
| 2,400,720 | 5/1946 | Staudinger | 117—138.8 XR |
| 2,499,421 | 3/1950 | Samler. | |
| 2,502,841 | 4/1950 | Henderson | 117—138 XR |
| 2,612,480 | 9/1952 | May. | |
| 2,622,056 | 12/1952 | DeCoudres. | |
| 2,639,998 | 5/1953 | Pavlic | 117—138.8 XR |

WILLIAM D. MARTIN, *Primary Examiner.*

JOSEPH B. SPENCER, RICHARD D. NEVIUS,
*Examiners.*